United States Patent
Ma et al.

(10) Patent No.: US 8,358,805 B2
(45) Date of Patent: Jan. 22, 2013

(54) SYSTEM HAVING A LAYERED ARCHITECTURE FOR CONSTRUCTING A DYNAMIC SOCIAL NETWORK FROM IMAGE DATA

(75) Inventors: Yunqian Ma, Roseville, MN (US); Roland Miezianko, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1113 days.

(21) Appl. No.: 12/124,293

(22) Filed: May 21, 2008

(65) Prior Publication Data

US 2009/0290755 A1    Nov. 26, 2009

(51) Int. Cl.
*G06K 9/00* (2006.01)
(52) U.S. Cl. ........... 382/103; 705/319; 340/573.1
(58) Field of Classification Search .......... 701/1, 104; 382/103
See application file for complete search history.

(56) References Cited

U.S. PATENT DOCUMENTS

| | | | |
|---|---|---|---|
| 7,016,307 B2 | 3/2006 | Vasudev et al. | |
| 7,249,123 B2 | 7/2007 | Elder et al. | |
| 7,366,759 B2 | 4/2008 | Trevithick et al. | |
| 7,450,735 B1 * | 11/2008 | Shah et al. | 382/103 |
| 7,512,628 B2 * | 3/2009 | Chess et al. | 705/7.11 |
| 7,519,200 B2 | 4/2009 | Gokturk et al. | |
| 7,818,394 B1 * | 10/2010 | Lawler et al. | 709/217 |
| 2004/0143602 A1 * | 7/2004 | Ruiz et al. | 707/104.1 |
| 2006/0285723 A1 * | 12/2006 | Morellas et al. | 382/103 |
| 2007/0174272 A1 | 7/2007 | Carter et al. | |
| 2007/0200851 A1 | 8/2007 | Said et al. | |
| 2007/0250898 A1 | 10/2007 | Scanlon et al. | |
| 2008/0091723 A1 | 4/2008 | Zuckerberg et al. | |
| 2008/0103721 A1 * | 5/2008 | Tsai et al. | 702/127 |
| 2008/0193010 A1 * | 8/2008 | Eaton et al. | 382/159 |

FOREIGN PATENT DOCUMENTS

WO    2008039401    4/2008

OTHER PUBLICATIONS

Hanneman et al., "Introduction to Social Network Methods," Online at http://faculty.ucr.ed/-hanneman/nettext/, 296 pages, printed Apr. 4, 2008.

Karypis et al., "Multilevel Algorithms for Multi-Constraint Graph Partitioning," 25 pages, May 5, 1998.

Schloegel et al., "A New Algorithm for Multi-Objective Graph Partitioning," 10 pages, Sep. 20, 1999.

* cited by examiner

*Primary Examiner* — Atiba O Fitzpatrick
*Assistant Examiner* — Thomas A James
(74) *Attorney, Agent, or Firm* — Seager Tufte & Wickhem LLC (57) ABSTRACT

A system having a layered architecture for constructing dynamic social network from image data of actors and events. It may have a low layer for capturing raw data and identifying actors and events. The system may have a middle layer that receives actor and event information from the low layer and puts it in to a two dimensional matrix. A high layer of the system may add weighted relationship information to the matrix to form the basis for constructing a social network. The system may have a sliding window thus making the social network dynamic.

20 Claims, 8 Drawing Sheets

Cameras setting file

- Camera 1
  - Frame rate
  - Path to video files
  - Name of video file = date.time.avi = 2008.1.23-11.54.59.avi
  - Name of video file
  - ...
- Camera 2
  - Frame rate
  - Path to video files
  - Name of video file
  - Name of video file
  - ...
- Example
- Camera 1
  - 1
    - Camera1\
      - 2008.1.23-11.55.31.avi
- Camera 3
  - 1
    - Camera3\
      - 2008.1.23-11.56.26.avi
      - 2008.1.23-12.07.53.avi Video Analytics Information — 41

*Figure 3*

Video Analytics Information

- Video description file .dsc
  - Timestamp date.time object, object, ...
    - Object = ID - body rectangle : face rectangle
    - Body rectangle = X Y width height
    - Face rectangle = X Y width height
  - Number of timestamps corresponds to the number of frames
- -Example
  - 2008.01.23-11.56.26.0000
  - 2008.01.23-11.56.27.0000
  - 2008.01.23.11.56.28.0000 1-207 362 308 115 : 0000
  - 2008.01.23-11.56.29.0000 1-319 218 264 258 : 0000
  - 2008.01.23-11.56.30.0000 1-451 76 178 376 : 0000
  - 2008.01.23-11.56.31.0000 1-509 44 160 336 : 0000
  - 2008.01.23-11.56.32.0000 1-585 40 118 342 : 628 41 51 56
  - 2008.01.23-11.56.33.0000 1-582 39 118 342 : 640 38 51 53
  - 2008.01.23-11.56.34.0000 1-544 45 157 341 : 628 51 51 53
  - 2008.01.23-11.56.35.0000 1-530 58 113 357 : 555 62 51 53
  - 2008.01.23-11.56.36.0000 1-527 58 113 357 : 547 63 51 53
  - 2008.01.23-11.56.37.0000 2-402 75 136 399 : 0000, 1-526 59 113 357 : 543 63 51 53
  - 2008.01.23-11.56.38.0000 1-446 86 154 389 : 499 98 51 53, 2-244 62 140 355 : 299 66 49 49
  - 2008.01.23-11.56.39.0000 2-240 65 132 360 : 291 73 49 49, 1-433 86 147 391 : 475 96 51 53

|     | E₁ | E₂ | E₃ |   |   |   | Eₙ |
| --- | -- | -- | -- | - | - | - | -- |
| P₁  | 1  | 1  | 1  | 1 | 1 | 0 | 0  |
| P₂  | 1  | 0  | 0  | 0 | 0 | 1 | 1  |
| P₃  | 0  | 1  | 1  | 0 | 0 | 0 | 0  |
| P₄  | 0  | 0  | 0  | 1 | 1 | 0 | 0  |
| P... | 0 | 0  | 0  | 0 | 0 | 0 | 1  |
| Pₘ  | 0  | 0  | 0  | 0 | 0 | 1 | 0  |

SYSTEM HAVING A LAYERED ARCHITECTURE FOR CONSTRUCTING A DYNAMIC SOCIAL NETWORK FROM IMAGE DATA

BACKGROUND

The present invention pertains to observations at facilities, and particularly to video observations that may be relevant to security operations.

SUMMARY

The invention is a system having a layered architecture for constructing a dynamic social network from image data of observations of people, objects and/or events.

DESCRIPTION

The present invention is a system for building a dynamic social network from image data. An ever present use of video sensors for monitoring may have transformed security operations at large facilities such as airports and critical infrastructures. Solutions enabling monitoring simple activities appear to be currently deployed in a large number of facilities. Some operators may have come to rely on such tools for their daily security operations. While these solutions and tools may achieve basic functions, they seem unable to detect activities of interest related to security threats. Additionally, they appear to lack a social network development capability relative to image data such as surveillance video.

Figure 1:
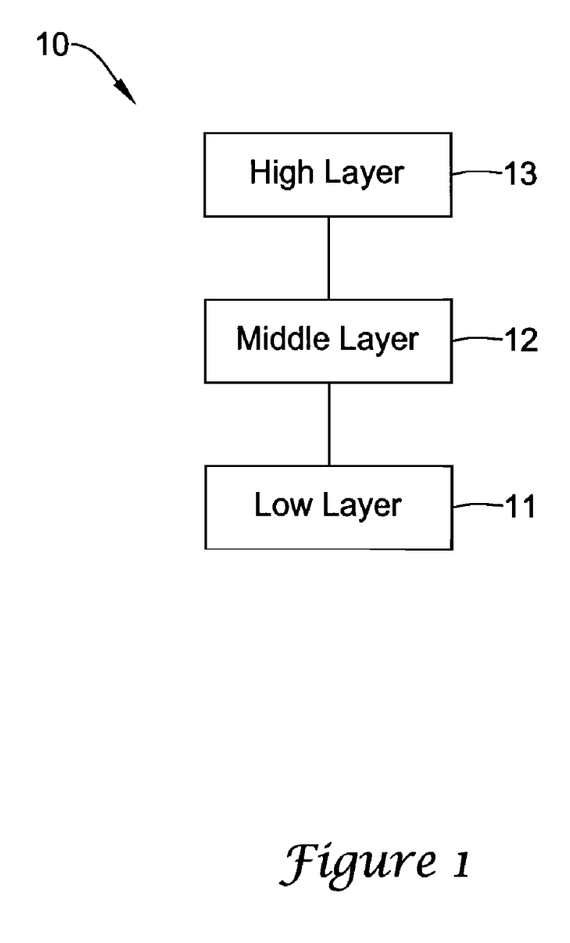
FIG. 1 is a diagram of an example of a layered architecture of a system for constructing a social network.

The present system includes an approach for constructing a dynamic social network from image data. In FIG. 1, a system 10 having a layered architecture may be used for constructing the dynamic social network.

The architecture may be structured with three or so layers. However, depending on the design, the architecture may have more or less than three layers. The present illustrative example may have three layers. First, a low layer 11 may include obtaining raw image data from the various sensors around a facility or the like under observation. This layer may include attaining video analytics results of actor-event involvement as drawn from the data. Such involvement may be put into a form of a raw matrix which may include such items as actor IDs, event IDs, one or more camera numbers, timestamps, location, associations between actors, and so forth. An actor may be a person or an object. A middle layer 12 may follow layer 11 and a high layer 13 may follow layer 12.

Figure 2:
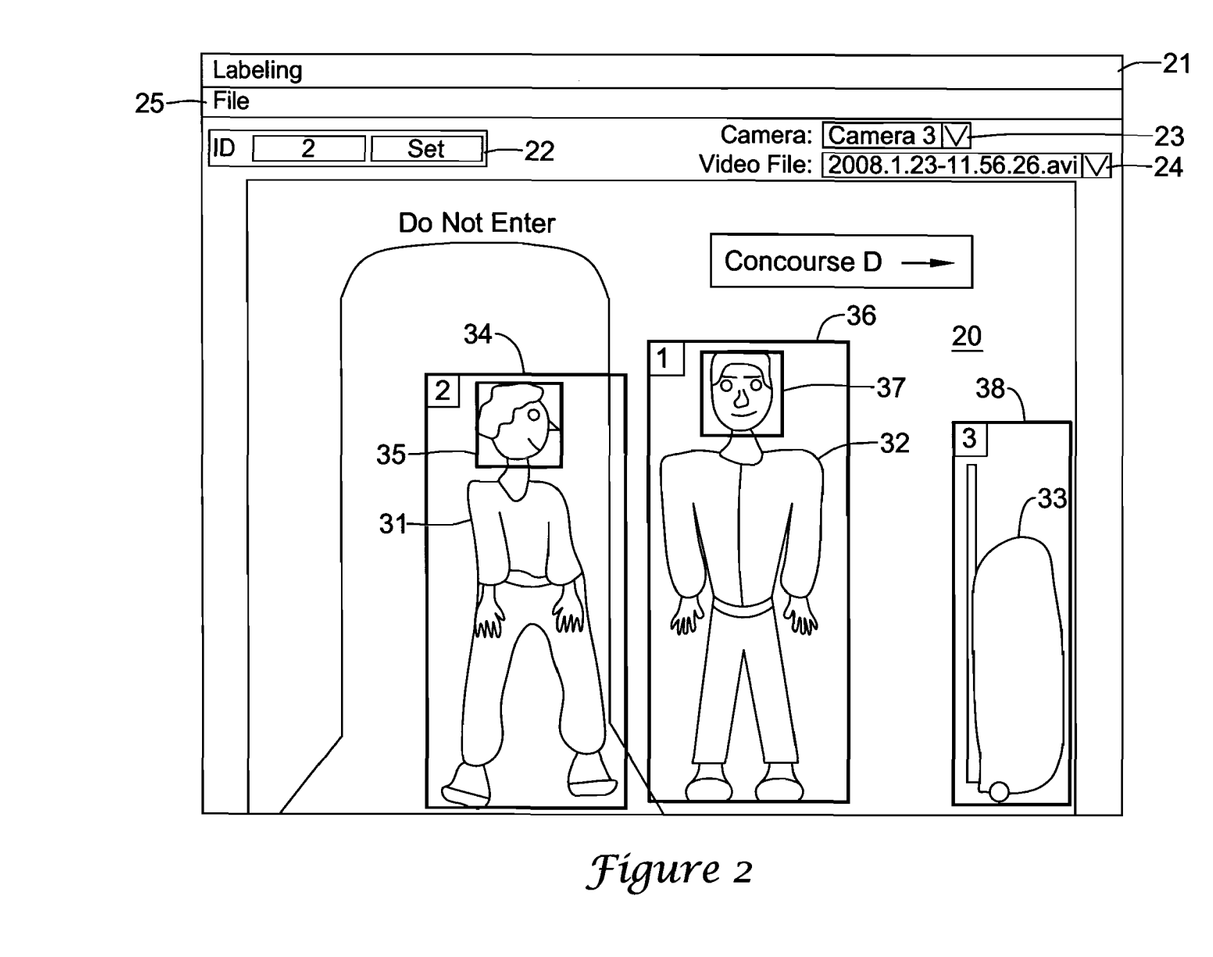
FIG. 2 is a diagram of an example screen showing an image and having components for obtaining, selecting and labeling portions of the image in the context of a low layer of the present system.

FIG. 2 is an example of an image 20 on a screen 21, such as that of a computer relative to the present system. Screen 21 may be a manual labeling and editing screen. A selection 25, entitled "File", may be made in order to load information about video files. Item 23 indicates a selected "Camera 3". Item 24 indicates the video file selected such as 2008.1.23-11.56.26.avi which gives date, time and avi. Item 22 provides for a setting of an ID "2" of a selected object in image 20. Image 20 shows three actors, persons 31 and 32, and luggage 33, in an airport environment. Actor 31 may have a body rectangle 34 and a face rectangle 35. Actor 32 may have a body rectangle 36 and a face rectangle 37. Actor 33 may have an object rectangle 38. Actors 31, 32 and 33 may have object IDs "2", "1" and "3" in the upper left corner of the body and object rectangles 34, 36 and 38, respectively. Rectangle 34 may be selected of an object ID setting as indicated at item 22. The other rectangles 36 and 38 may have object IDs assigned to them in a similar manner. Portions of image 20 may be extracted for analysis and storage. Those portions may include body rectangles 34 and 36, object rectangle 38, and face rectangles 35 and 37.

Figure 3:
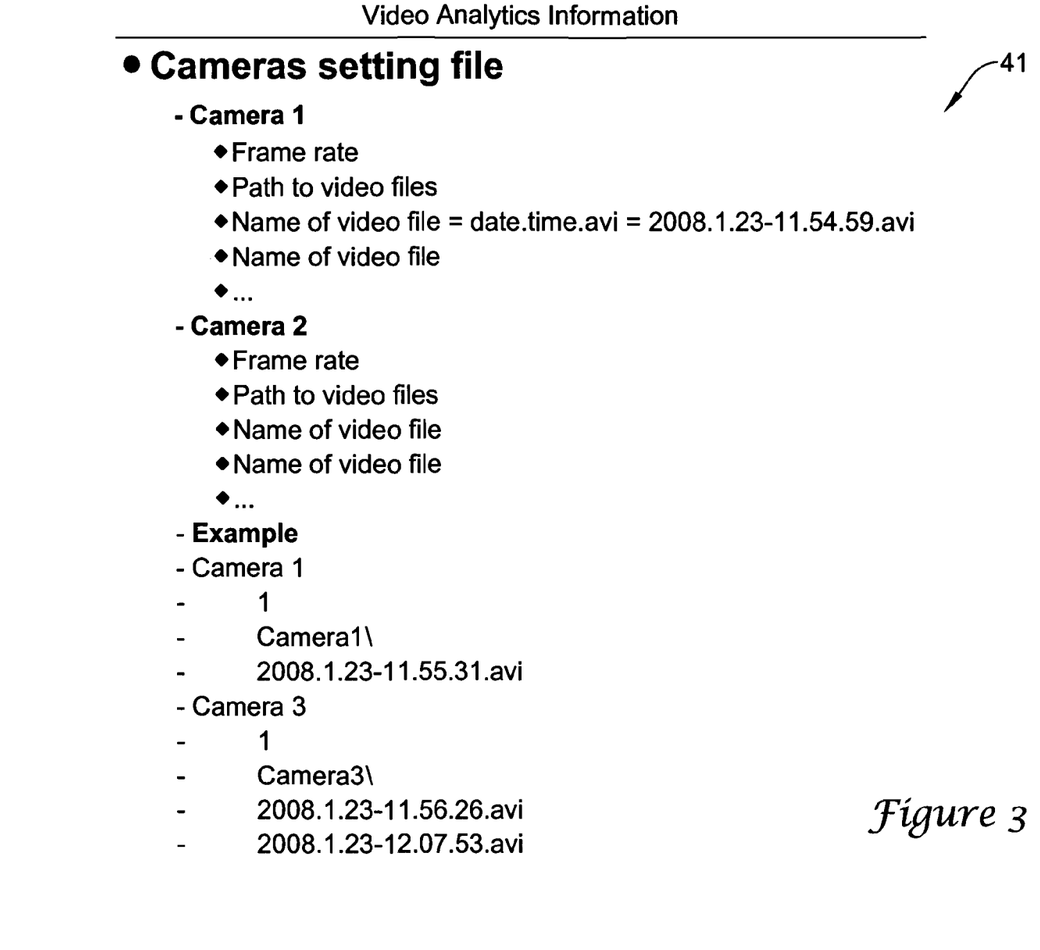
FIG. 3 shows a chart showing video analytics information of camera information

FIG. 3 shows video analytics information chart 41 for camera information. It shows "Cameras setting file" for camera 1, camera 2, and so on. The setting file may provide frame rate, path to video files, names of video files, and other pertinent information that may be useful. Examples are shown for cameras 1 and 3 in the lower portion of chart 41.

Figure 4:
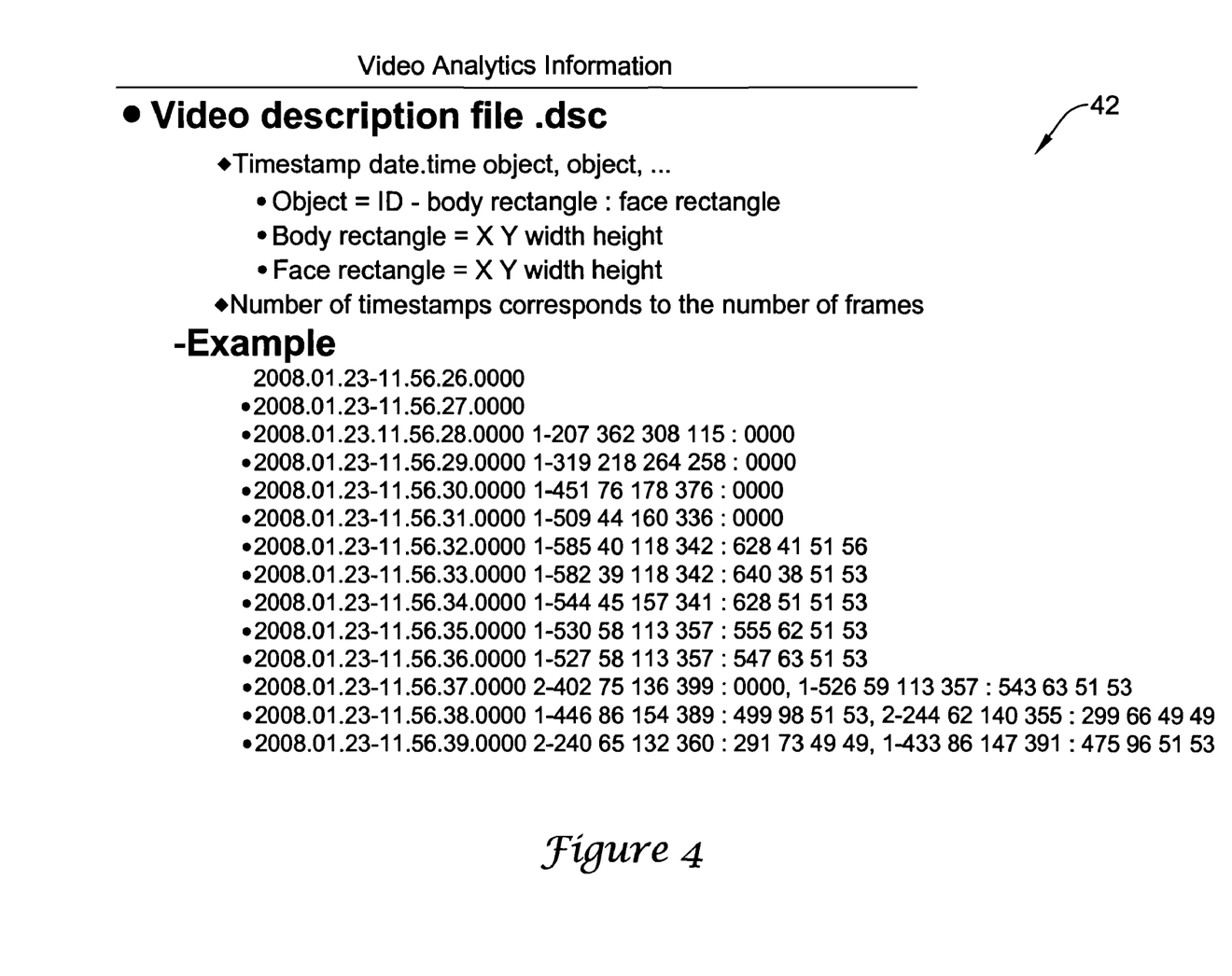
FIG. 4 shows a chart showing video analytics information of video descriptions.

FIG. 4 shows a video analytics information chart 42 for video description. The description may provide time stamp date, object ID for body and face rectangles, dimensions of the rectangles, and a number of time stamps which correspond to the number of frames. An example is shown in the lower portion of FIG. 4.

Second, a middle layer 12 may include an actor-event two-dimensional matrix. It may be a two-mode sociomatrix, where rows index actors and columns index events. For instance, if there are n actors and m events, then the two-dimension matrix may be an "n×m" matrix. An (i,j) cell of the matrix may be 1 if row actor i is involved with event j. Otherwise, the entry may be 0 if row actor i is not involved with event j. The row margin totals may indicate the number of events with which each actor is involved.

Third, a high layer 13 may include a social network of actors and relationships. Actors and nodes may be regarded as equivalent terms. Relationships, edges and links may be regarded as equivalent terms. The term "some" may mean at least one. A relationship may result from, be indicated by, inferred from, or described by an event among the actors. For each relationship, link or edge, a weight may be assigned. The greater the weight, the tighter is the relationship. The weight may have correspondence to an importance factor of a respective event.

The low, middle and high layers may be regarded as first, second and third layers, respectively, or vice versa. The three, more or less, layers may be labeled with other terms as may appear fitting.

Events may often involve two or more actors. Relative to the architecture of the present system, a relationship of the two or more actors indicated at the high layer may be inferred from the actor-event matrix of the middle layer. The events may build a linkage among the actors. The events may be co-location, co-temporal, and/or other.

In proceeding from the middle layer 12 to the high layer 13, an importance factor may be determined for each event. A weighted frequency may be calculated for the relationship between two actors in the high layer. A basic frequency may be proportional to the number of times that two actors have a one (1) in the same columns of a table or matrix. The weighted frequency may be the basic frequency multiplied by an importance factor or weight of a relevant event. Attendance at some of the events may have a magnitude of importance which may be referred to as a "weight".

In other words, the basic frequency may be a number of times that actors have been present at one or more of the same events. The weighted frequency of the relationship between the actors may be a product of the basic frequency and the weight assigned to the respective same event. The total of the weights assigned to all of the events of an actor-event matrix should be about one (1).

In sum, a dynamic social network may eventually be built from raw images or video with an approach that proceeds through the low layer 11, the middle layer 12 and the high layer 13, respectively, in the present system 10. With a sliding window in time, to reach back for information that has passed, the social network may be dynamic. Also, in that information is incomplete or updatable at a certain point in time, with the present system 10 in an on-line situation, data may continuously flow to the low layer for processing which may complete and/or update information already in the system, or bring in new information thus also resulting in the social network being dynamic.

Video or surveillance data may be extracted from the raw images or video at the low layer 11. The low layer may also handle image or video data for purposes of extracting and determining actors and events. A network of cameras may be used for collecting the data. For the same camera, or several cameras with overlapping fields of view, one may perform motion tracking of an association of an actor or actors. For different cameras, particularly with non-overlapping fields of view, there may be an identification (ID) association of an actor or actors between multiple cameras. The ID association may include face association, actor association, and/or biometrics association, such as standoff iris recognition. An association could instead be identification. Algorithms may be used for detecting and matching actors, faces, other biometrics, and more, especially with respect to identifying actors from one camera to another camera, actors at events, and actors associating and/or meeting with each or one another. Also, algorithms may be used to identify and/or associate events. The algorithms may be part of the video analytics at the low layer 11.

The events under consideration may be co-spatial events and/or co-temporal events. For example, a co-spatial event may involve an object, such as luggage, abandoned by one actor and picked up by another actor. The luggage and persons may be regarded as actors, i.e., object and persons. The abandonment and picking up of the luggage may be regarded as one or two events to be analyzed. The event may be attended by both actors but not necessarily at the same time and thus be regarded as co-spatial. If both actors are aware of each other's actions, they may be considered as attending one and the same event. If that is not the case, for example, the first actor leaves or abandons luggage in an airport, intentionally or unintentionally, and the second actor, such as security guard, picks up the luggage for safety reasons and has little or no knowledge about the first actor, and that the picking up is not a planned or coordinated act relative to the first actor, then both actions regarded as two events. The luggage itself may be regarded as an actor. If both actors were playing a role relative the abandoning and pick-up of the luggage, then these actions may be considered as attending one event. This event appears to be of interest, especially in an airport setting, and may have a particular significant importance. In another setting, the event may be considered as having insignificant importance.

The video analytics of the low layer analysis may extract the events, determine who the actors are, and check features and match features of the actors. Numerous actors may be noted. There may be a meeting, i.e., an event, between two actors indicating a spatial-temporal co-location, that is, two actors being simultaneously at the same location for the event. However, in some situations, an event may be just co-spatial or co-temporal. The actors and events may be extracted from the video data at the low layer. Such data may be reduced to an actor-event matrix at the middle layer 12. Attending an event, such as a meeting, may be regarded as a logic function "AND" in the grid, table or matrix. For example, two actors relative to an event may be indicated by a one or zero unit in the respective box of the matrix 51 as may be noted in FIG. 5.

Figure 5:
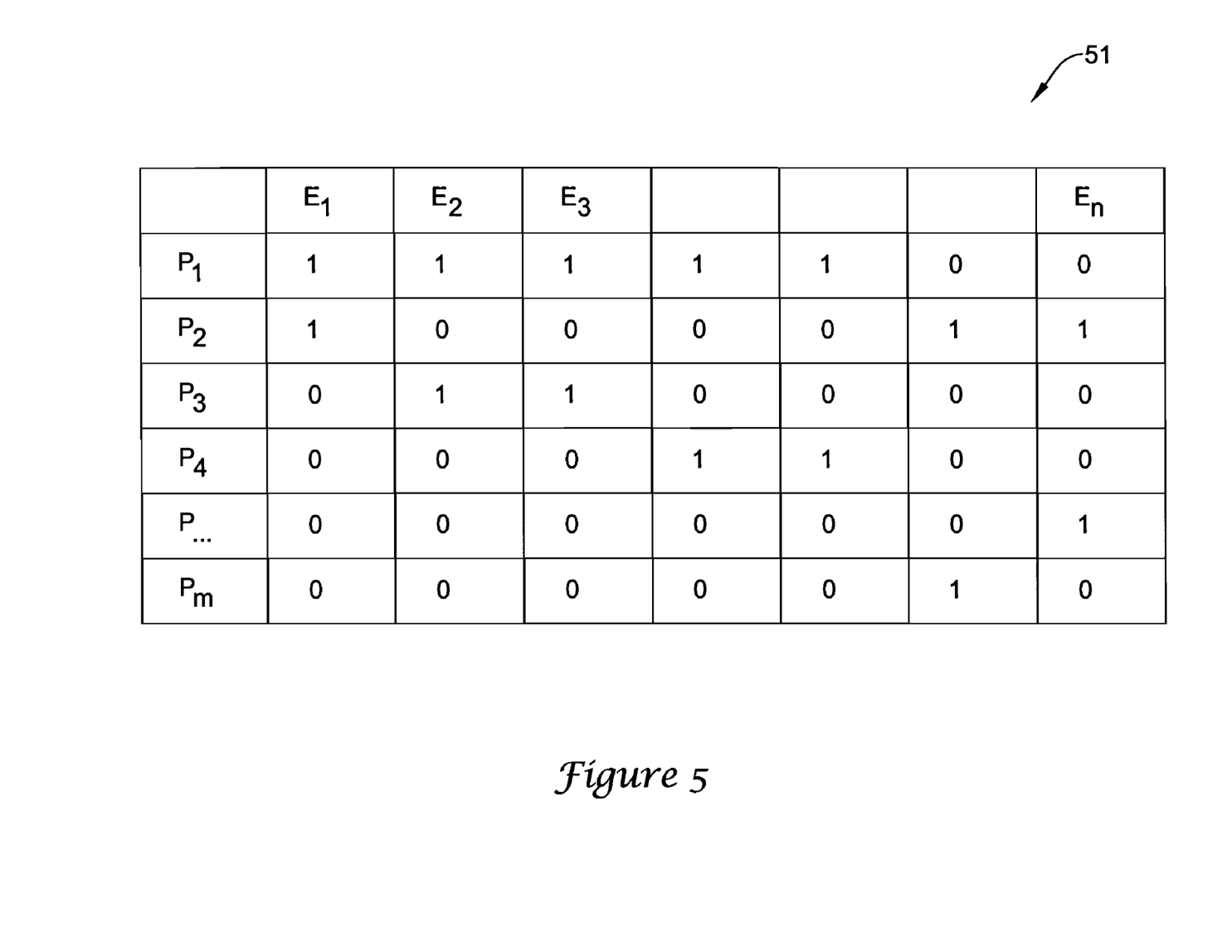
FIG. 5 shows a matrix listing actors and their attendance or non-attendance at events in the context of a middle layer of the present system.

Matrix 51 of FIG. 5, which may be at middle layer level 12 of architecture 10 in FIG. 1, lists actors $p_1$-$p_m$ and events $E_1$-$E_n$. It may be noted that $p_1$ attended five events, two of them attended by the actor $p_3$ and two of them by actor $p_4$. The other event was attended once by actor $p_2$. With many entries in such a table or matrix, a pattern of attendance by the actors of events may emerge revealing information of a social network.

Figure 6:
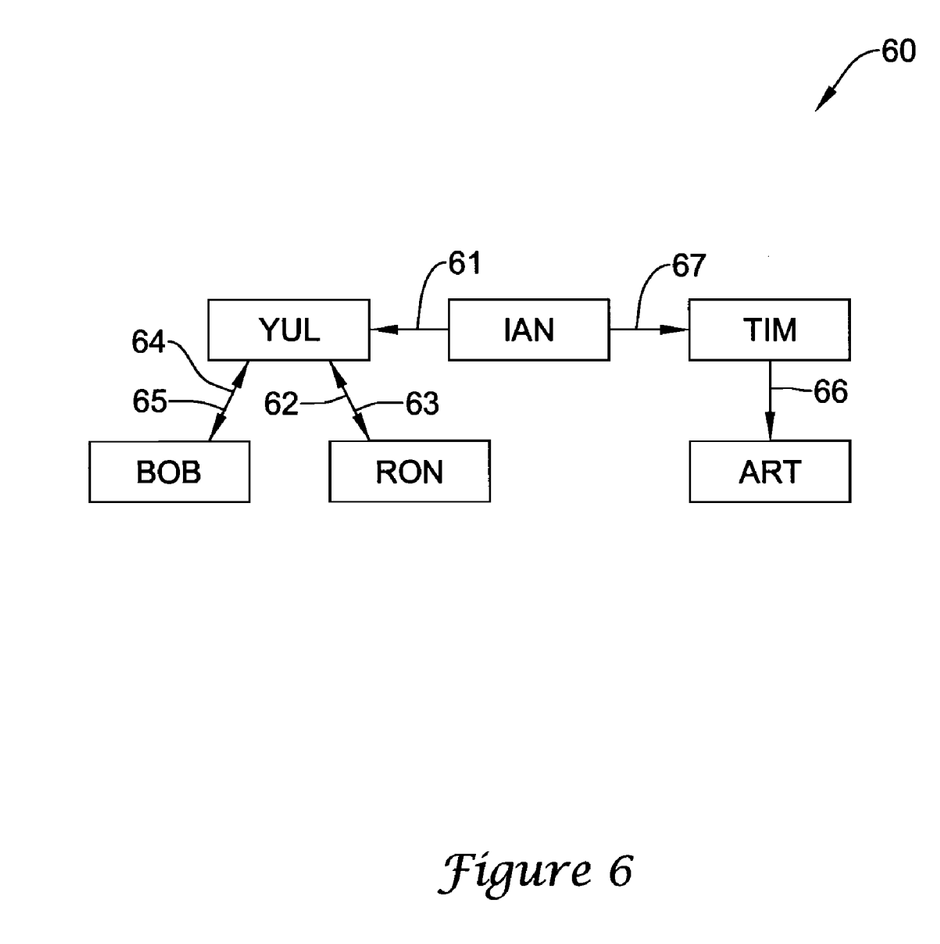
FIG. 6 shows a diagram of illustrative interactions or meetings among a number of actors.
Figure 7:
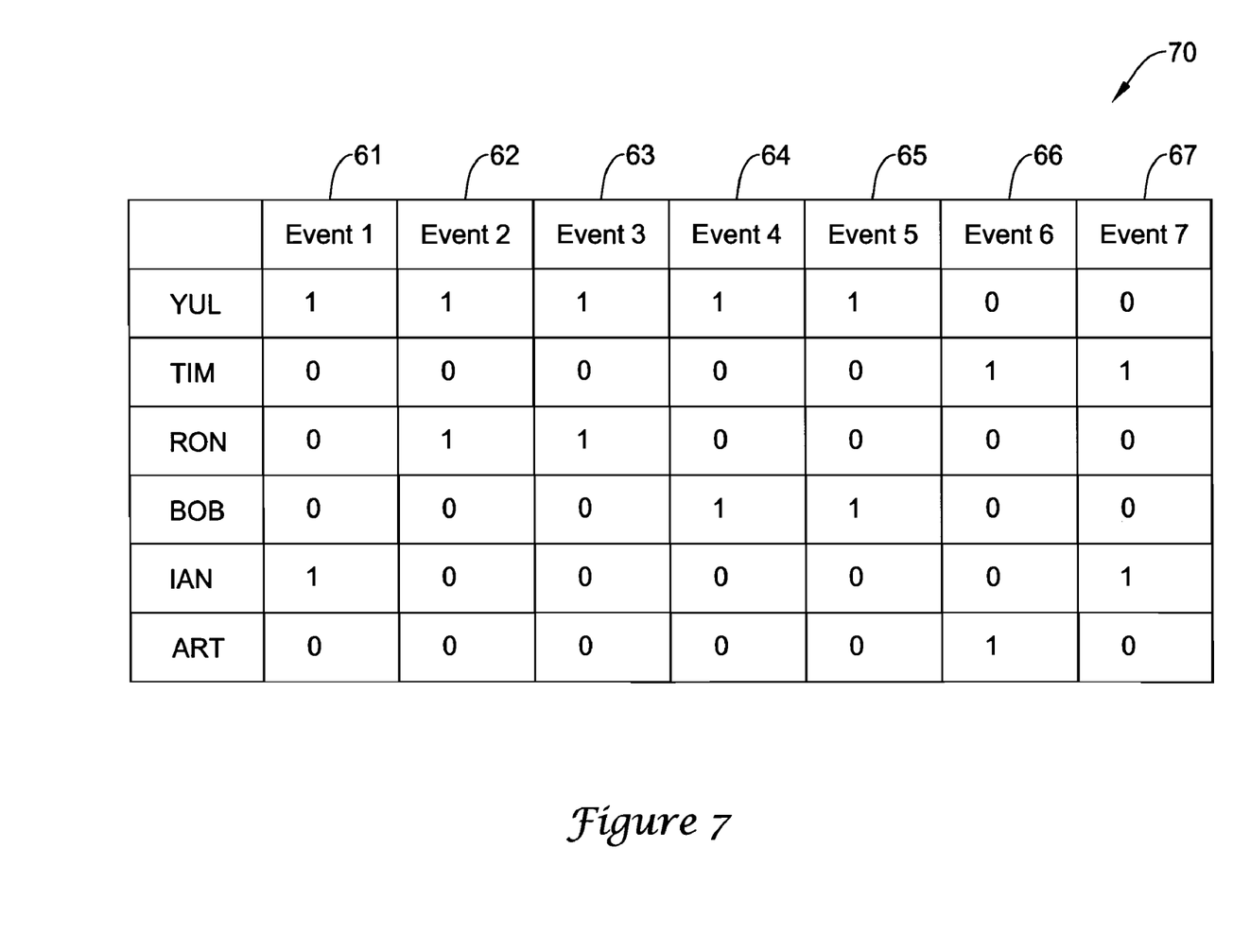
FIG. 7 shows a matrix incorporating information from the diagram in FIG. 6.

FIGS. 6 and 7 show a more concrete example of an interaction of actors. FIG. 6 is a diagram 60 of various interactions among actors named Yul, Ian, Tim, Bob, Ron and Art involving events labeled 61-67. The information of the diagram 60 in FIG. 6 may be placed in a matrix 70 in FIG. 7. The names of the actors are shown as rows and the events shown as columns. Each arrow may indicate that a meeting is at the office of the actor to which the arrow points. For instance, a meeting of Ian with Yul may be regarded as an event 61 at Yul's office and entered in matrix 70 as a "1" in cells that are intersections of Yul and Ian with event 61. The two meetings between Yul and Ron may be regarded as events 62 and 63. A "1" may be entered in a cell at the intersections of Yul and Ron under the columns of events 62 and 63 of matrix 70 in FIG. 7. Similarly, two meetings between Yul and Bob may be regarded as events 64 and 65. A "1" may be entered in a cell at the intersections of Yul and Bob under the columns of events 64 and 65. A meeting of Tim with Art may be regarded as an event 66. A "1" may be entered in cells at the intersection of their names under the column of event 66 in matrix 70. A meeting of Ian with Tim may be regarded as event 67. A "1" may be entered in cells at the intersection of their names and event 67. These meetings, as indicated by "ones" may be links, relationships or edges between the actors or nodes.

There may be a spatial-temporal frequency. For instance, actors meeting five times within one week may establish a link. The link may be regarded as weak, moderate or strong. One meeting time between actors may be regarded and a weak or no link. The link may be from an event. Each event may have a weight. The weights of events may vary. An important event may have a significant weight. The abandoning of a piece of luggage at an airport may be an important event having a significant weight. If an event has no importance, it may have a weight of zero, and there may be no result of connection, relationship, edge or link between or among the actors of concern.

Figure 8:
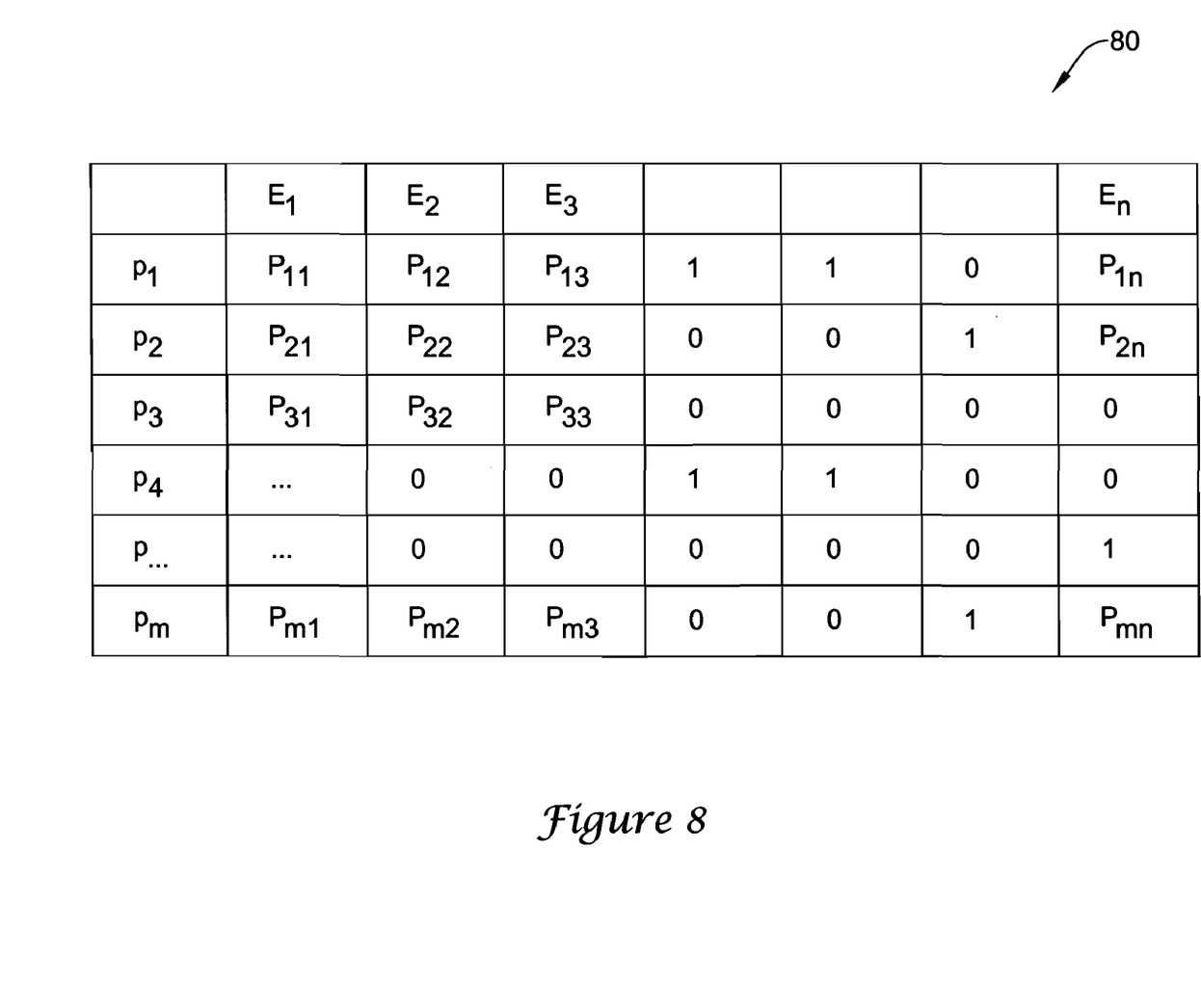
FIG. 8 shows a matrix listing actors and events, and identifying the relationships for constructing a social structure.

FIG. 8 shows a table or matrix 80 where a transition may be made from the middle layer 12 to the high layer 13 of architecture or system 10. The links or intersections of actors and events in matrix 70 of FIG. 7 may be noted with a "1" or "0" for attendance or non-attendance at layer 12. However, matrix 80 is another step towards information to provide a basis for constructing the social network. Events may have importance factors. Consequently, weights may be assigned to links. There may be a threshold value (T) of a weight for a link to be recognized. The value may be designated to be equal to or greater than some selected number. Weights of links may be used to derive a social network. The weights of the links between or among actors may provide the basis for the social network of the actors at the high layer 13 of the system 10 architecture.

Matrix 80 may be an extended one, as shown in FIG. 8. The actors as indicated in the far left column and the events are listed in the far top row. These labels technically are not part of the actual matrix. In some of the cells, which are intersections of the actor rows and the event columns, not only are there some clear values of links of attendance and non-attendance, such as zeros and ones, respectively, but there are weights assigned to the links. There may be perturbations, an index, labels, and so on. Link weights for several actors may be derived from the event weights (as shown herein) which in turn can be derived from importance factors of the events. The designation of a link weight (arguably analogous to a probability of significance or importance in certain contexts) in matrix 80 relative to an actor may be indicated by a P with the subscripts indicating the actor and the event, respectively. $P_1$, $P_2 \ldots P_n$ may represent the actors. $E_1, E_2 \ldots E_m$ may represent the events. For the first listed actor, $p_1$, the weight relative to the third listed event, $E_3$, may be $P_{13}$. For the third listed actor, $p_3$, the weight relative to second listed event, $E_2$, may be $P_{32}$. There may be a total of m actors and a total of n events. One may have $P_{11}, \ldots P_{1n}, P_{11}, \ldots P_{m1}, \ldots P_{mn}$, filling in the cells of matrix 80 relative to the weights for the actors and events.

The events may be extracted from raw data, where $w_1$ may be a weight value assigned for one event, and other weights assigned for other events.

$$"W = \sum_{i=1}^{N} W_i".$$

A maximum value of W may be 1. There may be one weight per event, and the weights of all of the events may add up to one. Link weights may be calculated for actors relative to the events as illustrated herein.

"i" and "j" may be actors.

$$L(P_i, P_j) = w_1(P_{i1} * P_{j1}) + \ldots + w_N(P_{iN} * P_{jN})$$

$$W = \sum_{i=1}^{N} w_i = 1$$

$$L(P_i, P_j) = \sum_{k=1}^{N} w_k(P_{ik} * P_{jk})$$

$$L(P_i, P_j) > T$$

For implementation of the multi-layer architecture of the present system, a sliding window may be part of a dynamic social network at the high layer 13 of the present system 10 as it adds a dynamic feature to the network. A sliding window of frames or minutes may be regarded as a temporal window. There may be, for example, a twenty minute sliding window. Minutes may be regarded as more consistent measurement than frames. For instance, there may be a fast frame rate and a slow frame rate. There may be a same amount of time for different numbers of frames. The window may be slid back to examine earlier moments of an actor or event which after a period of observation became of interest.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A network construction system having a layered architecture and utilizing surveillance video stored in files on a computer, where the surveillance video is from one or more image sensors, comprising:
    a first layer that captures image data in the files and identifies actors and events in the image data and provides identifications for the identified actors;
    a second layer that indicates which actors in the image data are involved in which events in the image data; and
    a third layer that:
        infers links between the actors in the image data from the second layer; and
        assigns a weighted frequency to at least some of the links between the actors in the image data, where the weighted frequency is dependent on the events in the image data in which the actors in the image data are involved; and
        constructs a network of linked actors in the image data based on the inferred links between actors in the image data; and
    wherein:
        a first identification and a second identification are provided for identification of one or more of the identified actors in the image data; and
        the weighted frequency indicates a strength of a link between the actors in the image data.

2. The system of claim 1, wherein the first layer comprises video analytics for identifying the actors and events of the image data.

3. The system of claim 2, wherein the video analytics identifies an actor in the image data and tracks the actor in the image data from one image sensor to another image sensor, where the image sensor and the another image sensor may have overlapping or non-overlapping fields of view.

4. The system of claim 1, where the second layer comprises a matrix of actors and events in the image data.

5. The system of claim 4, wherein:
    the matrix is two-dimensional; and
    the third later infers the links from the matrix.

6. The system of claim 1, further comprising a sliding window relative to image data to make the network dynamic.

7. The system of claim 1, wherein:
    A basic frequency id established based on a number of times that several actors in the image data have been present at a same event; and the weighted frequency of the link between the actors in the image data comprises a product of the basic frequency and a weight assigned to the event in the image data.

8. A method for constructing a relationship network from image data of at least one sensor, comprising:

constructing a first layer of the relationship network, comprising:
   capturing image data from the at least one sensor into a file in a computing environment; and
   processing the image data to identify actors in the image data and events in the image data one a screen, where the processing includes assigning a first identification and a second identification to an identified actor in the image data;
constructing a second later of the relationship network, comprising:
   indicating the actors in the image data involved with the events in the image data; and
constructing a third layer of the relationship network, comprising:
   inferring relationships between the actors in the image data involved with the events in the image data; and
   constructing the relationship network in the computing environment of the actors in the image data and the relationships, where the constructed relationship network is configured to detect activities of interest related to security threats; and
wherein a weighted frequency establishes the strength of the relationships between the actors in the image data, where the weighted frequency of a relationship between the actors in the image data comprises a product of the basic frequency and is weight assigned to the event in the image data.

9. The method of claim 8, further comprising sliding a window relative to the image data resulting in the relationship network being dynamic.

10. The method of claim 9, wherein:
the actors in the image data and the events in the image data are placed in a two-dimensional matrix at the second layer;
a first dimension indexes the actors in the image data;
a second dimension indexes the events in the image data; and
a common intersection cell of an actor in the image data and an event in the image data in the matrix has an entry of a 1 or 0, indicating involvement or non-involvement of the actor in the image data with the event in the image data, respectively.

11. The method of claim 8, wherein:
processing image data at the first layer provides information placed in a raw matrix; and
the raw matrix comprises:
   actor identifications;
   event identifications;
   camera numbers;
   timestamps;
   locations;
   associations between actors; and/or
   relationship network pertinent items.

12. The method of claim 11, wherein processing the image data is effected by a video analytics algorithm.

13. The method of claim 8, wherein the third layer further comprises assigning weights to the events.

14. The method of claim 8, wherein:
a basic frequency is established based on a number of times that actors in the image data have been present at a same event in the image data according to a two-dimensional matrix.

15. A layered architecture for a relationship network construction, comprising:
a low layer that processes image data to identify distinctive actors in the image data and distinctive events in the image data;
a middle layer that:
indicates the events in the image data that each distinctive actor in the image data is involved with;
places the actors in the image data and the events in the image data into a two-dimensional matrix, wherein:
   a first dimension indexes the actors in the image data;
   a second dimension indexes the events in the image data; and
   an common intersection cell of an actor in the image data and an event in the image data in the matrix indicates involvement or non-involvement of the actor in the image data with the event in the image data, respectively; and
a high layer that establishes relationships among the distinctive actors in the image data in the middle layer from the two-dimensional matrix and constructs a relationship network from the imaged data; and
wherein the low layer provides a first identification and a second identification for one or more of the identified distinctive actors in the image data.

16. The architecture of claim 15, wherein the low layer comprises video analytics that identify the actors and events of the image data.

17. The architecture of claim 16, wherein the events in the image data and the actors in the image data involved with the events in the image data are indicated in a matrix of the middle layer.

18. The architecture of claim 17, wherein in the high layer a weight is assigned to some of the events.

19. The architecture of claim 18, wherein a weight indicates an amount of importance of an event of one of the relationships.

20. The system of claim 2, wherein the video analytics identifies the actors in the image data by extracting a body rectangle and a face rectangle from the image data for one or more identified actors and assigns the first identification to the body rectangle and the second identification to the face rectangle.

* * * * *